United States Patent
Pirlet

[11] 3,899,663
[45] Aug. 12, 1975

[54] MEASURING DIMENSIONS OF SECTIONS

[75] Inventor: Robert Alfred Pirlet, Embourg, Belgium

[73] Assignee: Centre de Recherches Metallurgiques-Centrum voor Research in de Metallurgie, Brussels, Belgium

[22] Filed: June 18, 1973

[21] Appl. No.: 370,660

[30] Foreign Application Priority Data
June 20, 1972 Belgium ............................. 785160

[52] U.S. Cl. ............ 235/151.32; 340/179; 356/156; 356/158
[51] Int. Cl. ...................... G06f 15/20; G01b 11/00
[58] Field of Search ........ 235/151.3, 151.32; 356/2, 356/3, 156–158, 160, 167; 340/177 R, 179, 189; 33/267, 284; 250/312

[56] References Cited
UNITED STATES PATENTS
| | | | |
|---|---|---|---|
| 3,513,444 | 5/1970 | Henderson et al. | 356/157 X |
| 3,619,070 | 11/1971 | Pirlet | 356/156 X |
| 3,667,846 | 6/1972 | Nater et al. | 356/156 X |
| 3,673,394 | 6/1972 | Hartmann | 250/312 X |
| 3,762,818 | 10/1973 | Johnson et al. | 356/156 X |

*Primary Examiner*—Malcolm A. Morrison
*Assistant Examiner*—Jerry Smith
*Attorney, Agent, or Firm*—Holman & Stern

[57] ABSTRACT

To measure the dimensions of an elongate section such as a rolled or extruded section, two fixed observation points are chosen so that the elongate section lies between them. Two directional telemeters are arranged to measure the distance from the respective observation points to the section along a directional axis which is pivotable about a pivot axis passing through the corresponding observation point and extending along the elongate section; the observation points and directional axes lie in a single plane transverse to the elongate section, and the intersection of this plane with the elongate section has a periphery which is the sectional contour of the elongate section. The sectional contour is scanned by means of the telemeters by pivoting the directional axes about the pivot axes. The distance and direction of a plurality of points on the sectional contour with respect to the corresponding observation point are recorded. The dimensions of the elongate section are computed from the said distances and directions.

13 Claims, 1 Drawing Figure

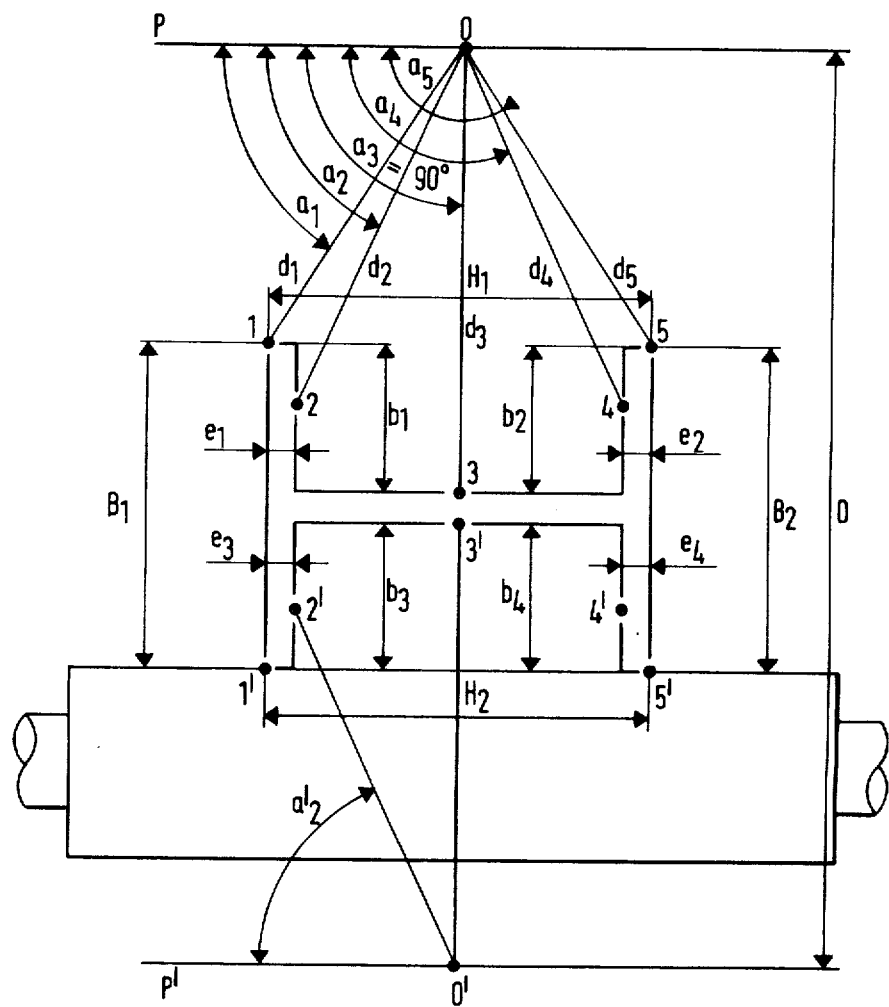

MEASURING DIMENSIONS OF SECTIONS

The present invention relates to a method of remotely measuring the dimensions of an elongate section, such as a rolled or extruded section, on the basis of two fixed points. This invention is particularly interesting in the case of complex sections, such as double T-beams, more particularly when these products are asymmetrical.

The measurement of the dimensions of sections has always occupied the minds of metallurgists because the number of dimensions involved is generally high and because of the amount of time required to carry out direct measurements. In the majority of cases the dimensions are measured by contact between a measuring apparatus and the section, and the result is that the measuring apparatus has to be moved a number of times. In addition the presence of an operative is absolutely essential. Hence there is an interest in remotely measuring all the dimensions of a section on the basis of two fixed points.

It is always possible in practice to convert measurements of dimension into measurements of distance. It has already been suggested along these lines to measure the distance between a fixed point and metallurgical products, such as sheets and sections, by using a telemeter, an optical telemeter for example, comprising more particularly a television camera. The use of these optical telemeters is based on the fact that the measurement of the distance between an object and a fixed point is effected by projecting onto this object from a transmitter visible or infrared optical radiation whose orientation is known relative to a reference direction. At one point, the position of which is known relative the transmitter, the angle made with the reference direction by the beam of radiation reflected by the object towards this point is measured, and this makes it easily possible to calculate the distance between the object and the transmitter.

The present invention provides a method of measuring the dimensions of an elongate section, in which two fixed observation points are chosen so that the elongate section lies between them; two directional telemeters are arranged to measure the distance from the respective observation points to the section along a directional axis which is pivotable about a pivot axis passing through the corresponding observation point and extending along the elongate section, the observation points and directional axes lying in a single plane transverse to the elongate section, the intersection of this plane with the elongate section having a periphery which is the sectional contour of the elongate section; the sectional contour is scanned by means of the telemeters by pivoting the directional axes about the pivot axes; the distance and direction of a plurality of points on the sectional contour with respect to the corresponding observation point are recorded; and the dimensions of the elongate section are calculated from the said distances and directions.

Preferably, for a channel section or I-section, the points are characteristic of the contour of one side of the section and are at least four in number, these being:

a. the two ends of this contour, in other words the first and last point met with during systematic scanning of this contour, b. the meeting point of the straight line connecting the two observation points with the side of the section substantially perpendicular to the straight line, c. a point situated on the inner face of each flange of the contour.

According to the invention the detection of the two ends of the contour is advantageously carried out by systematically scanning the contour, one end of the contour being detected when the distance measured passes from an infinite value to a finite value, and the other end being detected, when the distance measured passes from a finite value to an infinite value.

In a preferred embodiment of the invention, the reference direction relating to the determination of the orientation of each of the distances measured is perpendicular to the straight line connecting the two observation points.

Detection of the point of intersection of the straight line connecting the two observation points with the face of the profiled section which is perpendicular to this straight line is advantageously effected by noting the moment when the angle between the directional axis of the telemeter and the reference direction is 90 degrees.

Similarly, the detection of the point situated on the inner face of each flange is carried out by noting the moment when the first derivative with respect to time — of the product of the distance measured times the cosine of the angle between the directional axis and the reference direction is zero.

According to a particularly advantageous operational embodiment of the invention, in order to calculate all the dimensions of the profiled section on the bases of the values which have been committed to memory for distance and orientation, these data are transmitted to a computer which processes them according to a simple program, while the telemeter completes its scanning operation, and the memory is then reset to zero, preferably at the end of the scanning operation, so that a fresh series of measurements may begin when a new scanning operation is started.

In order to carry out such measurements radiation of appropriate wavelength is projected on to this profiled section and the radiation reflected by the section is received. In order to obtain satisfactory accuracy, for example of the order of 0.1 mm, it is advantageous to use a transmitter projecting very directional electromagnetic radiation, for example a laser, or a beam of millimetric or submillimetric wave length.

It has been proved advantageous according to the invention to synchronize the rotation of the two directional axes of telemeters in such a way that the orientations measured are always equal ($\alpha_i = \alpha'_i$).

Similarly according to the invention the distances separating the observation points of each of the faces of the profiled section disposed perpendicularly in respect of the straight line connecting these two observation points are equal when the width of the base is equal to half the sum of the upper and lower dimensions tolerated in the manufacture for this width.

Whatever the methods used to measure distance and angle, the data thus obtained require only very simple calculations to deduce the desired dimensions, and this is capable of being done currently in a very rapid manner by digital or analog means and without expenses which are so high as to affect the economic use of the apparatus.

The invention will be described further, by way of example only, with reference to the accompanying drawing, which schematically illustrates the measurement of the dimensions of an elongate section.

The section shown in the drawing is a symmetrical I-beam, of which it is desired to measure the dimensions and verify the symmetry. The beam has two flat bases, each made up of a pair of flanges, and a web.

The two observation points chosen for the measurement of this section are 0 and 0'; they are fixed with respect to each other and situated on both sides of the web on a straight line 00' substantially perpendicular to the web and intersecting the web approximately in the middle.

A first directional telemeter (not shown) is placed at 0 and a second telemeter at 0'. These telemeters — and consequently their directional axes — are made to pivot about 0 and 0' in such a way that each of them completely scans the part of the contour of the section turned towards it; in other words, the telemeter situated at 0 scans the contour 1 to 5 and that situated at 0' scans the coutour 1' to 5'. In the course of this scanning, the distance from each observation point to each of the points constituting the part of the contour which is scanned and also the orientation of each of these distances relative to a reference direction is measured. Under these conditions each of the contour points is defined by two co-ordinates: the distance ($d_i$) and the orientation ($\alpha_i$). At certain given moments the distance and orientation values relative to a small number of points characteristic of the contour of the profiled section are memorised. In the case of the telemeter positioned at 0 the points which are characteristic of the part of the contour turned towards this observation point are five in number:

a. the points 1 and 5, being the two ends of the contour which is scanned,
b. the point 3 which is the point intersection of the straight line 00' with the web of the elongate section,
c. the points 2 and 4 which are situated on the inwardly-directed face of each flange.

The reference direction OP, relative to which the orientation of each of the distances 01 to 05 is measured is perpendicular to the direction 00'.

The detection of the point 1 is effected in the following manner. The directional axis of the telemeter at 0 is pivoted in an anti-clockwise direction from the initial direction OP, at a constant angular velocity. Before the directional axis meets the contour 1 to 5 the value of the distance $d_i$ measured by the telemeter is infinite. As a result the point 1 is detected by noting the moment at which the distance measured by the telemeter passes from an infinite value to a finite value. Conversely the point 5 is detected by noting the moment at which the distance measured by the telemeter passes from a finite value to an infinite value.

The detection of the point 3, which is situated in the middle of the web of the elongate section, is very easily carried out by noting the moment at which the angle $\alpha$ is equal to 90°. This is a result of the fact that the reference position chosen is perpendicular to direction 00'.

The detection of the points 2 and 4 which are situated on the inner face of each of the two flanges is carried out by observing the product of the measured distance $d_i$ times the cosine of the angle $\alpha_i$ representative of the orientation of this distance relative to the reference position OP. It will be seen that the projection of the distance $d_2$ on the straight line OP is constant for any point (such as 2) located on this face of the flange. As a result, if the first derivative of $d \cos\alpha$ with respect to time is continuously calculated this derivative becomes zero at the moment when the directional axis of the telemeter meets the face on which the point 2 is located and remains zero for the whole of the period of the scanning of this face. It is clear that this also applies to the point 4 which is situated on the face of the other flange.

The same measurements are made in respect of points 1' to 5' relative to the reference position 0'P'.

The distances and angles relative to the points 1 to 5 and 1' to 5' which have been automatically memorised as they are obtained are then transmitted to a calculating unit which determines all the dimensions of the elongate section according to the following simple formulae:

Thickness of flanges
$e_1 = d_1 \cos\alpha_1 - d_2 \cos\alpha_2$
$e_2 = d_5 \cos\alpha_5 - d_4 \cos\alpha_4$
$e_3 = d'_1 \cos\alpha'_1 - d'_2 \cos\alpha'_2$
$e_4 = d'_5 \cos\alpha'_5 - d'_4 \cos\alpha'_4$ Thickness of web
$a = D - (d_3 + d'_3)$ Depth of flanges
$b_1 = d_3 - d_1 \sin\alpha_1$
$b_2 = d_3 - d_5 \sin\alpha_5$
$b_3 = d'_3 - d'_1 \sin\alpha'_1$
$b_4 = d'_3 - d'_5 \sin\alpha'_5$ Depth of bases
$B_1 = D - (d_1 \sin\alpha_1 + d'_1 \sin\alpha'_1)$
$B_2 = D - (d_5 \sin\alpha_5 + d'_5 \sin\alpha'_5)$ Width and parallelism between bases
$H_1 = d_1 \cos\alpha_1 + d_5 \cos\alpha_5$
$H_2 = d'_1 \cos\alpha'_1 + d'_5 \cos\alpha'_5$ It will thus be seen that after measuring the distances ($d_i$) and the orientations ($\alpha_i$) it is sufficient to calculate the expressions $d \sin \alpha$ and $d \cos \alpha$ to obtain, by means of simple addition or subtraction, the values of all the dimensions of the elongate section.

These calculations are carried out by an analog computer or digital computer while the telemeter completes its rotation, and the memory is reset to zero at the end of this rotation, so that it is possible to start a new series of measurements at the time when a new scanning procedure starts.

One type of telemeter unit suitable for providing the distance measurements ($di$) according to the present invention may be the one known as the "Geodolite 3G" laser distance measuring instrument manufactured by Spectra-Physics of California. The angular measurements ($\alpha i$) may obviously be obtained by a potentiometer suitably attached to the pivotable telemeter unit. The analog distance and angle measurements obtained from such a telemeter and potentiometer may be converted to digital form by an A/D converter for processing by a computer programmed in accordance with the foregoing or similar formulae. An example of a suitable computer is the "Nova 1200" manufactured by Data General. The output from the computer may be reconverted to analog form by a suitable D/A converter to provide the desired output information.

The above example is peculiar to the use of the process in the application with a Grey-type beam, which has parallel flanges of constant thickness and a number of sharp angles.

In the case of a section with flanges or bases whose thickness is not constant (e.g. normal-type small beams or U-sections) the nominal thickness is taken as the thickness of the base or flange taken at a set distance (conventional) from the edge of the said base of flange.

The method of the invention still makes it possible by means of a suitable but easy calculation to determine the thicknesses at these places, which shows that the method may be used for all normal types of section.

I claim:

1. A method of measuring the dimensions of an elongate section, comprising: selecting two fixed observation points so that the elongate section lies between them; arranging two directional telemeters to measure the distance from the respective observation points to the section along a directional axis which is pivotable about a pivot axis passing through the corresponding observation point and extending along the elongate section, the observation points and directional axes lying in a single plane transverse to the elongate section the intersection of this plane with the elongate section having a periphery which is the sectional contour of the elongate section; scanning the sectional contour by means of the telemeters by pivoting the directional axes about the pivot axes; recording the distance and direction of a plurality of points on the sectional contour with respect to the corresponding observation point; and calculating the dimensions of the elongate section from the said distances and directions.

2. A method as claimed in claim 1, wherein the number of points whose distance and direction are recorded is the number necessary and sufficient to characterise all the dimensions of the sectional contour.

3. A method as claimed in claim 1, wherein the elongate section has two lateral flanges connected by a web, and wherein the points on one side of the sectional contour whose distance and direction with respect to the corresponding observation point are recorded are at least four in number, these being the two ends of this side of contour; the point at which the straight line connecting the two observation points intersects this side of the contour; this point lying on the web, the web being transverse to the said straight line; two points each being situated on the inner face of each said flange.

4. A method as claimed in claim 3 wherein the direction of each point is determined with respect to a reference direction perpendicular to the straight line connecting the two observation points.

5. A method as claimed in claim 3, wherein the two ends of the contour are detected by systematically scanning the contour between two directions at which the distance measured by the telemeter is infinite, one end of the contour being detected when the value of the distance measured passes from an infinite value to a finite value, the other when the value of the distance measured passes from a finite value to an infinite value.

6. A method as claimed in claim 4, wherein the point at which the straight line connecting the two observation points intersects the contour is taken to be the point at which the angle between the directional axis and the reference direction is 90°.

7. A method as claimed in claim 4, wherein the point situated on the said face of one said flange is detected by scanning at a constant angular velocity and automatically calculating the first derivative with respect to time of the product of the measured distance times the cosine of the angle between the directional axis and the reference direction, the point being detected when the said derivative is zero.

8. A method as claimed in claim 1, wherein the said distances and directions are recorded in a memory store, and the calculation of the dimensions is carried out by a computer while the scanning operation is completed, the memorised data then being automatically erased so that a new series of measurements may be recorded when a fresh scanning operation starts.

9. A method as claimed in claim 1, wherein the distance between one of the said points and the observation point is measured by means of the telemeter by directing electromagnetic radiation towards that point, receiving the radiation reflected by the said point, and measuring the time taken by the radiation in travelling to and from the said point.

10. A method as claimed in claim 9, wherein the radiation is laser radiation.

11. A method as claimed in claim 9, wherein the radiation is millimetric or sub-millimetric wavelength.

12. A method as claimed in claim 1, including automatically synchronising the pivotal motion of the two directional axes so that their orientations are equal at all times during scanning.

13. A method as claimed in claim 1, wherein the distances separating the observation points from each of the faces of the elongate section intersected perpendicularly by the straight line connecting the two observation points are equal when the distance between these two faces is equal to half the sum of the upper and lower values of this distance tolerated in the manufacture of the elongate section.

* * * * *